United States Patent
Kiefer

[15] 3,704,984
[45] Dec. 5, 1972

[54] CHAMBER AND FILAMENT STRUCTURE AND METHOD FOR FLOW THROUGH THERMAL CONDUCTIVITY MICRO SIZE MEASURING CHAMBERS

[72] Inventor: Michael Edward Kiefer, Raleigh, N.C.

[73] Assignee: Triangle Environmental Corporation, Raleigh, N.C.

[22] Filed: May 17, 1971

[21] Appl. No.: 143,836

[52] U.S. Cl. ................................................73/27 R
[51] Int. Cl. ...........................................G01n 27/18
[58] Field of Search.......73/27 R, 27 A, 23.1, 23, 362 AR, 73/204; 23/254 E, 255 E; 338/28

[56] References Cited

UNITED STATES PATENTS

| | | | |
|---|---|---|---|
| 3,012,212 | 12/1961 | Hicks | 73/362 AR |
| 3,138,948 | 6/1964 | Pfellerle | 73/27 R |
| 3,242,717 | 3/1966 | Matte et al | 73/27 R |
| 3,352,154 | 11/1967 | Djorup | 73/204 X |

Primary Examiner—Richard C. Queisser
Assistant Examiner—C. E. Snee, III
Attorney—B. B. Olive

[57] ABSTRACT

A chamber and filament structure and method of chamber formation and filament support for micro size, i.e. 10 microliters or less, thermal conductivity measuring chambers are based on supporting the detecting filaments on a suitable relatively thin electrically and thermally insulating substrate, e.g. mica, and utilizing the wall support surface of the substrate as a significant portion of the total wall surface of the detecting chamber thereby mechanically stabilizing the filaments, minimizing the chamber size and dramatically increasing the ability of the chamber to detect the presence and concentration of minute quantities of unknowns, e.g. insecticide on a lettuce leaf.

10 Claims, 16 Drawing Figures

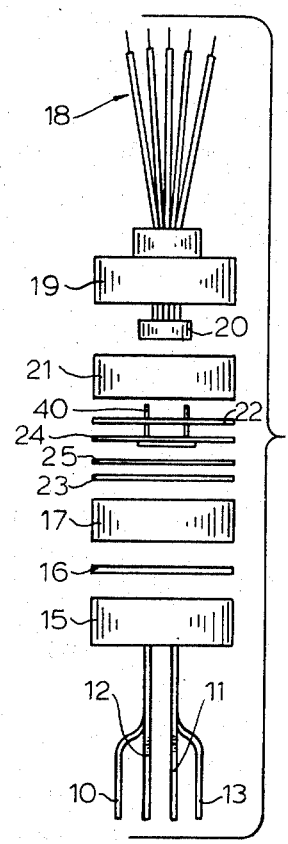
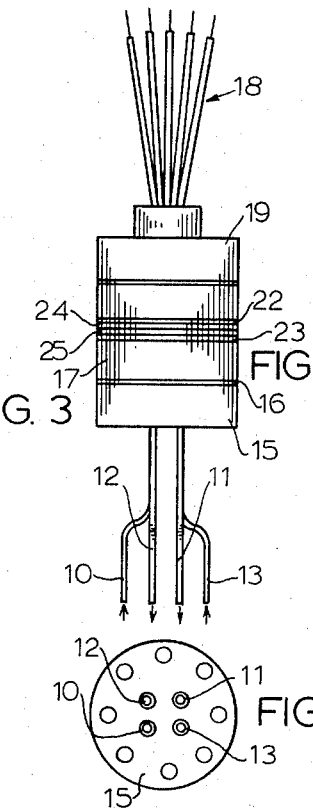
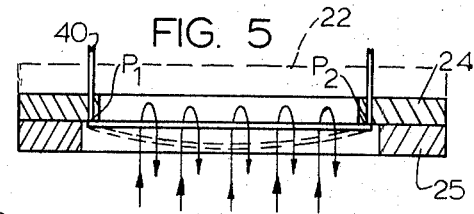
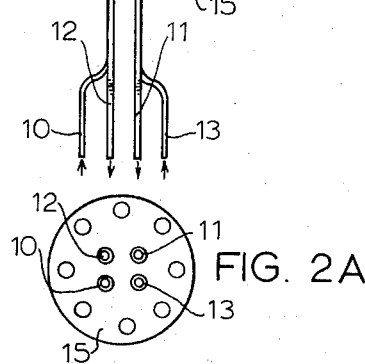
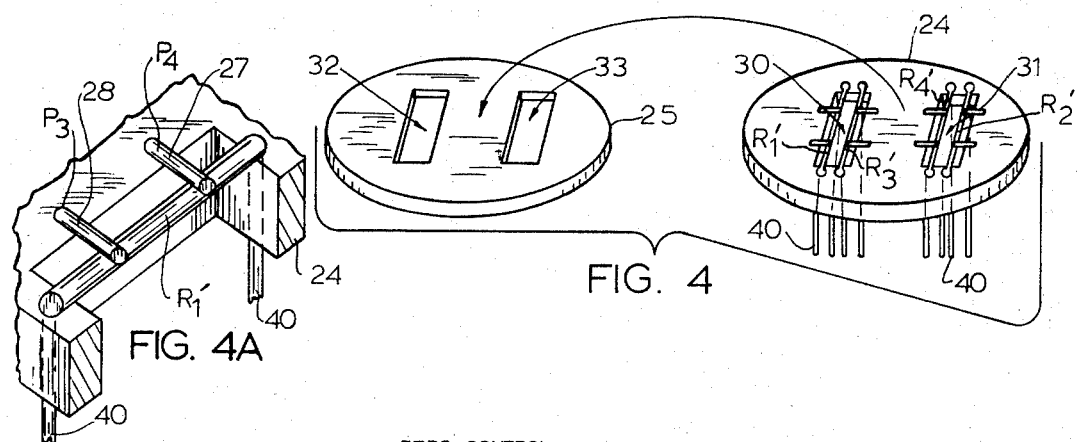
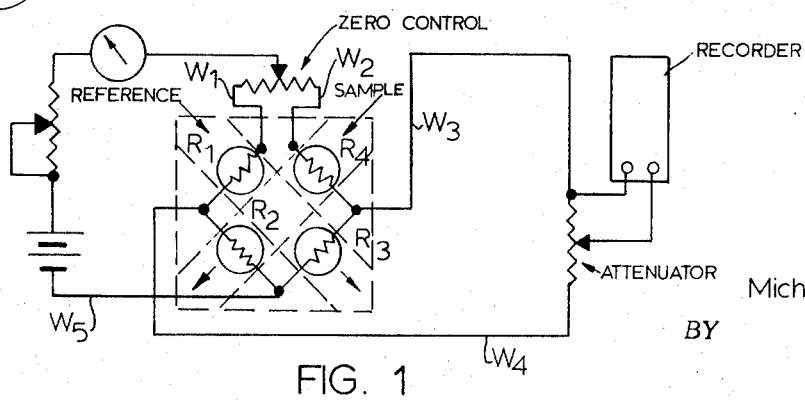
INVENTOR.
Michael E. Kiefer

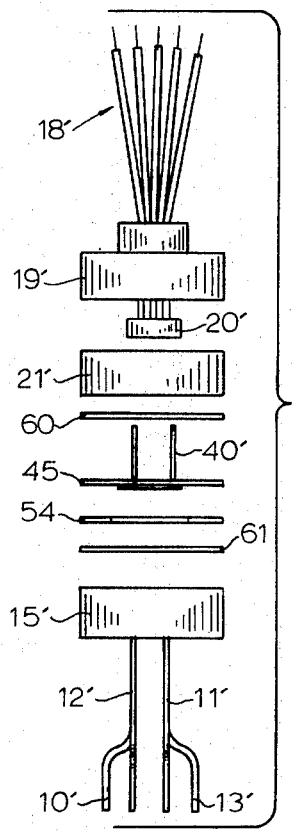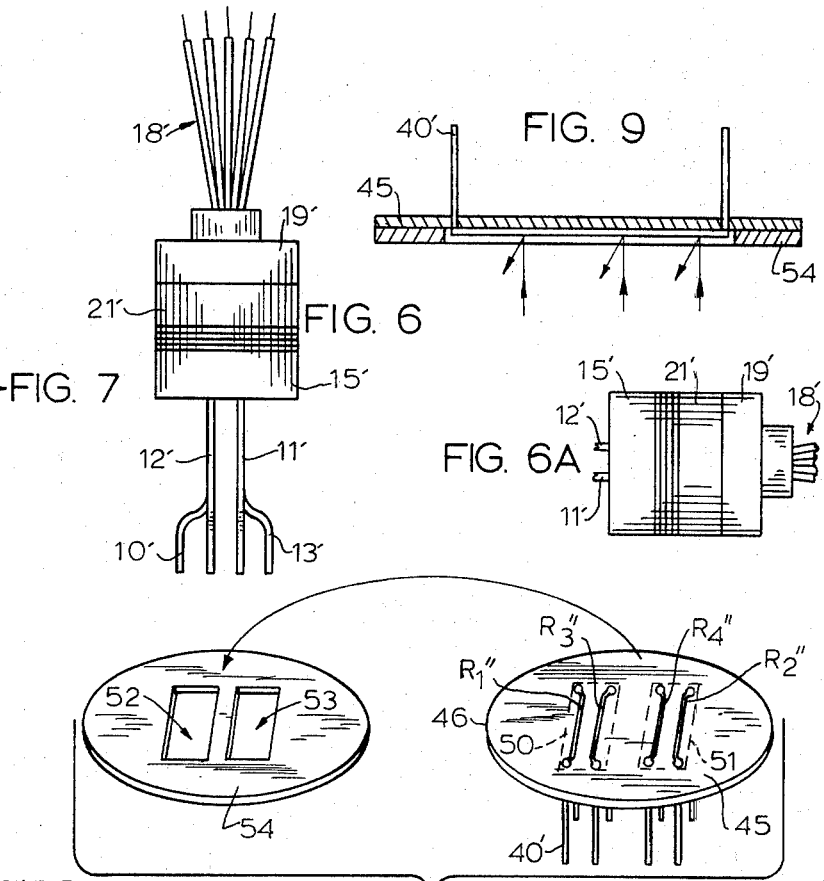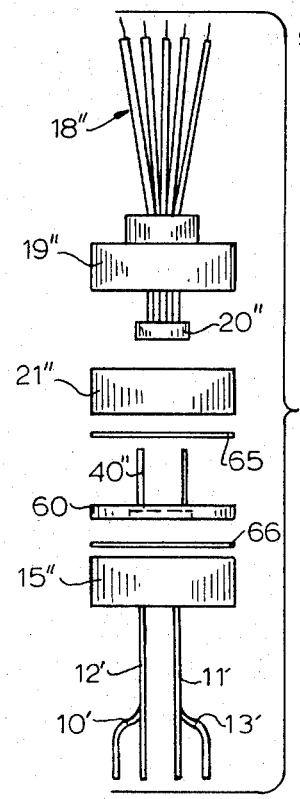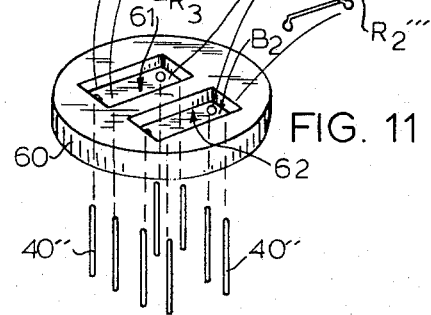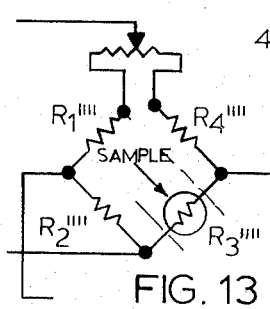

CHAMBER AND FILAMENT STRUCTURE AND METHOD FOR FLOW THROUGH THERMAL CONDUCTIVITY MICRO SIZE MEASURING CHAMBERS

BACKGROUND OF THE INVENTION

1. Field of the Invention

This invention relates to thermal conductivity detectors used in chromatography and particularly to micro size, flow through type thermal conductivity measuring chambers in which filament stability and chamber volume are critical. More specifically, the invention relates to the structures and methods associated with forming the chambers and supporting the filaments in such chambers.

2. Description of the Prior Art

In the art of analyzing gaseous compounds a common practice is to use the thermal conductivity character of a particular unknown gaseous compound as an indication of the nature of the compound. Where extremely small quantities or traces of a particular unknown compound are involved, it is known to separate unknown compounds in a column and then flow the unknown gaseous compound in and out of a "chamber" in which the compound contacts a heated wire filament. At the same time that the unknown gaseous compound is contacting one filament or set of filaments a known reference gas is contacting another filament or set of filaments and the filaments are part of a bridge circuit. The bridge becomes unbalanced according to the thermal conductivity character of the unknown gaseous compound passing through the chamber and an electrical reading is obtained which is indicative of the presence and concentration of the unknown gaseous compound.

In some thermal conductivity measuring chambers the size of the chamber is not critical because of the quantity of gaseous compound being analyzed. Furthermore, the absolute mechanical stability of the filaments employed is not critical. However, where it is desired to detect very minute quantities of unknown gaseous compounds the size of the chamber becomes extremely critical and furthermore the mechanical stability of the electrical filaments becomes critical.

In the type of thermal conductivity measuring chamber with which the present invention is concerned, the chamber is in the order of 10 microliters or less in volume. The most common construction employed for this micro size chamber is illustrated by the "Servomex" thermal conductivity detector made by Servomex Controls, Ltd., of Crowborough, Sussex, Eng. In this detector a mica disc is provided with a pair of slots and a pair of wire filaments are suspended across each slot. The ends of the filaments are secured to one face of the mica disc adjacent the slots. Each filament is further stabilized with a pair of short wires which attach to the filament at points within the slot and at other points on the slot edge. Another mica disc has mating slots and is clamped against the first disc. The volume of the "chamber" constitutes the amount of space provided by the length, thickness and widths of the two slots. The gaseous compounds flow into the chamber, flow around the filaments and then flow out. Since wire filaments when suspended between two points of support tend to sag when heated as required during thermal conductivity measurements, the mentioned mica disc must be relatively thick. Consequently, the overall chamber size must be relatively large, 2.6 microliters volume being the smallest chamber achieved to date. Since the filaments form an electrical bridge, the distortion of the filaments introduces erratic electrical behavior, produces electrical and thermal "noise" and generally limits possible physical orientations of the thermal conductivity detector. That is, it becomes desirable to physically position the thermal conductivity detector in such a way that the chamber filaments are oriented vertically and the sagging effect minimized. Other disadvantages that have been recognized in the prior art method and structure, include the recognition that the ohmic resistance of the wire filaments becomes critical, the wire filaments become difficult to electrically "match", the response is relatively slow, and it becomes necessary to form the filaments of a material which exhibits a high specific resistance.

In summary, in the type of micro size thermal conductivity measuring chambers with which the present invention is concerned the prior art devices have not been able to deal with extremely minute quantities of unknown gaseous compounds because of an inability to reduce the size of the measuring chamber. The method of detecting has been based on causing the gases to flow into the chamber, around the wire filaments and then out. Furthermore, the prior art thermal conductivity measuring chambers have been based on a wire filament structure and a method of forming the thermal conductivity measuring chambers which inherently prevented reduction of the measuring chamber below a predetermined volume and furthermore inherently introduced many undesirable mechanical stability problems and undesirable electrical problems related to the wire filaments and their method of mounting.

SUMMARY OF THE INVENTION

According to the invention the filaments are applied in the form of thin, narrow precision formed conducting strips which are supported from and adhered to an extremely thin electrically and thermally insulating substrate, e.g. mica, and in a manner wherein the wall support surface of the substrate forms a significant portion of the total wall surface of the detecting chamber and also acts as a gas reflecting barrier. The gas compounds instead of flowing around the filaments contact or strike only a portion of the surface area of the filament, are reflected by the substrate and then flow out. The filaments of the invention are preferably formed flat, are inherently electrically matched and each with a predetermined precise resistance, have a substantially longer life than normal, are supported on the substrate throughout their lengths without being suspended, employ filament materials of a lower than normal specific resistance while still maintaining overall filament resistance comparable to conventional filament resistances, may be practically used whether supported vertically, horizontally, or in other angled positions, and may be utilized without introduction of electrical noise. Of particular and significant importance, the filament and chamber structure and method of invention allow the size of the detecting chamber to be substantially smaller than normal which means a dramatic increase in the ability to detect the presence and concentration of minute quantities of unknown gaseous compounds. Whereas the conventional detecting chamber is limited to approximately 2.6 microliters as being the smallest practical size that can be achieved the present invention allows the detecting chamber to be as small as 20 nanoliters or even less.

DESCRIPTION OF THE DRAWINGS

FIG. 1 is a basic wiring diagram of a thermal conductivity detector such as is employed with conventional chromatography equipment.

FIG. 2 is an elevation view of a conventional device shown assembled and in a vertical position.

FIG. 2A is an end view of the pipe mounting end of the conventional device.

FIG. 3 is an exploded view of the conventional device.

FIG. 4 is an exploded view illustrating how the filaments are conventionally supported and the chamber formed.

FIG. 4A is a greatly enlarged portion of FIG. 4 illustrating how the conventional filament is secured at points intermediate its length.

FIG. 5 is an enlarged section view taken through a pair of discs used in the conventional device illustrating filament support, chamber formation and conventional gas flow.

FIG. 6 is like FIG. 2 and is an elevation view of an assembled device in a vertical position and made according to the invention.

FIG. 6A shows an alternate operating position of the device of the invention.

FIG. 7 is an exploded view of the new device according to the invention.

FIG. 8 is an exploded view, like FIG. 4, but showing the manner in which the filaments are supported and the chamber formed according to the invention.

FIG. 9 is an enlarged section view, like FIG. 5, but showing how the discs are assembled according to the invention to form a micro size chamber, support the filaments and provide a reflecting barrier for the gas flow pattern.

FIG. 10 is an exploded view of a second embodiment of the invention.

FIG. 11 is an exploded view showing the manner in which the chamber and filaments are supported and formed in the second embodiment.

FIG. 12 is an exploded view of a third embodiment.

FIG. 13 is a circuit diagram of a circuit suited to the third embodiment.

DESCRIPTION OF THE PREFERRED EMBODIMENT

FIGS. 1 through 5 are each concerned with prior art practices and are shown to more readily understand the invention. Referring first to FIG. 1 there is shown a prior art thermal conductivity detector bridge circuit for what is conventionally referred to as four filament "cells" having four wire resistive elements R1, R2, R3 and R4 which resistive filaments, in general, constitute the "filaments" of the prior art and of the present invention. Filaments R1, R3 are conventionally in one "chamber" and are contacted by the reference gas. Filaments R2, R4 are in another chamber and are contacted by the sample gas. With this in mind it may be noted that the invention is primarily concerned with the method and structure related to forming the chambers and filaments and to supporting the filaments in the detecting chamber. What should also be recognized with reference to FIG. 1 is that the conventional resistive elements or filaments R1, R2, R3 and R4 are in the nature of filament wire of circular cross section. Such wires are conventionally cut approximately to length and then electrically matched by being precision cut to final lengths. Each such conventional filament is supported in space as later explained and the respective reference and sample gas flows follow paths around the respective wires. In comparison, it should also be noted with reference to FIG. 1 that the referred to filaments R1, R2, R3 and R4 according to their equivalents in the present invention are in the nature of conducting strips which are extremely thin, are physically and electrically precision formed, are supported for their entire length by being adhered to a substrate as distinct from being suspended in space across a hole formed in such a substrate and which contact the respective gases only with portions of the filament surface area. The foregoing will be better understood as the description proceeds.

To better understand the present invention, there are shown in FIGS. 2, 2A, 3, 4, 4A, and 5 various views of a conventional thermal conductivity device. For purpose of illustration these FIGURES are based on the previously mentioned "Servomex" thermal conductivity detector since this detector follows the long established and conventional practices. A detailed explanation is given in the Servomex Instruction Manual entitled "-Micro Katharometer — Type MK. 158" and identified by the title cover notations "158/1001/2/10.68 — 235/1351/2/10.68". Such a device is employed with a bridge circuit as illustrated by FIG. 1. The inlet pipes 10 and 11 receive the respective reference and sample gases which are subsequently discharged through the outlet pipes 12, 13. A sample gas, for example, may enter inlet pipe 10, be directed around filaments R4 and R2, be reflected by gasket disc 22, and then be directed out of outlet pipe 12. Similarly, a particular reference gas may enter inlet pipe 11, be directed around filaments R1, R3 and then out of outlet pipe 13. For purposes of simplification, the several bolts and threaded holes which are normally used to very rigidly and tightly bolt together the pieces shown in FIGS. 2 and 3 have not been shown. That is, the assembly shown in FIG. 2 when tightly bolted together is hermetically sealed from outside gases except those which enter and leave from the pipes 10, 11, 12 and 13. Also, it should be understood that pipes 10, 11, 12 and 13 may terminate in cap member 15 and holes are provided in the other pieces as necessary to form gas passages to and from the filaments.

In FIGS. 2 and 3, cylindrical shaped end cap member 15 is typically formed of a metal having a good heat conductivity characteristic and mounts the respective inlet and outlet pipes 10, 11, 12 and 13 as well as various bolts, not shown. A thin gasket aluminum disc 16 is mounted between cap member 15 and a similarly shaped metal, cylindrical member 17. Disc 16 and member 17 are suitably punched with holes or threaded connections as required to mate the tubes and bolts. At the opposite end of the device there is a set of conductor wires 18 mounted in a metal cap member 19 suitably secured by bolts, not shown, to a cylindrical member 21. Conductor wires 18 in FIGS. 2 and 3 correspond to wires W-1, W-2, W-3, W-4 and W-5 in FIG. 1 and terminate in a connector terminal cap 20. An aluminum gasket disc 22 and a similar aluminum gasket disc 23 are employed on either side of two mica discs 24, 25. While not shown, it should be understood that discs 22, 23, 24 are punched with appropriate bolt and conductor lead holes as required. Discs 24 and 25 are most directly concerned with the present invention and a more detailed description now follows with reference to FIGS. 4, 4A and 5.

In FIG. 4 discs 24 and 25 are shown inverted from their normal positions. It will be noted that disc 24 includes a pair of open slots 30, 31 and across each such slot it will be noted that there is mounted a pair of filament wires indicated as R1′, R2′, R3′ and R4′. To increase filament stability short, lateral, stringer wires are conventionally secured to each filament between the filament and the edge of the slot. Stringer wires 27, 28 in FIG. 4A illustrate this practice. Disc 25 has a comparable pair of open slots 32, 33 which do not mount wire filaments but which are mated with the respective slots 30, 31 as illustrated in FIG. 4 and FIG. 5. The wire filaments shown in FIG. 4 when assembled and suitably electrically connected through leads 40 to connector 20 in the manner of FIGS. 2 and 3 thus occupy the "chamber" space provided by the volume of the slots 32 and 33. It will also be noted that each filament is in effect suspended for the entire length of the slot and is secured at end points, e.g. P1, P2, on one side face of disc 24 and through respective stringers, e.g. stringers 27, 28 (FIG. 4A) to side points, e.g. points P3, P4. Keeping in mind the fact that the filaments operate at relatively high temperatures in the order of 500 degrees centigrade or more it can readily be seen that each filament, and its respective stringers, has a tendency to sag or bend and such tendency is inherent to the conventional method and structure illustrated by FIGS. 2 through 5. The foregoing discussion while based on the "Servomex" detector could be applied to any of many other such detectors. For example, see *Journal of Gas Chromatography*, Volume 4, pages 273–284, August 1968 and particularly page 278 which discusses the sagging and noise problem.

Referring next to FIGS. 6 through 10 there is shown a preferred first embodiment of the invention and it will be noted that the device of the invention while generally similar to the prior art device just described differs in certain critical respects.

In the manner of the prior art device there are provided appropriate inlet and outlet tubes 10′, 11′, 12′ and 13′ and appropriate conductors 18′. Cap members 15′, 19′, 20′, 21′ compare in structure and function to the already described members 15, 19, 20 and 21 therefore no further detailed description is deemed necessary. According to the invention, the filaments identified as R1″, R2″, R3″ and R4″ in FIGS. 8 instead of being formed of resistance wire and electrically matched by cutting to length are instead formed in the manner of a printed circuit conductor. That is, the filaments are physically and electrically precision formed flat and thin and are adhered to a side surface 45 of a thermally and electrically insulating substrate disc 46 so as to be supported at all points. Furthermore, it will be noted that filament mounting disc 46 is unslotted and that the surface areas 50, 51 on which the filaments are mounted mate with slots 52, 53 of a mating disc 54. Thus, the filament mounting areas 50, 51 become a significant part of the "chamber" wall formed by slots 52, 53 when mated so as to encompass areas 50, 51. Areas 50, 51 also act as a gas barrier wall and serve to reflect the gases. In the construction of the invention the gas flow pattern instead of enveloping or flowing around the filament is a flow pattern in which the respective reference and sample gas only contacts certain exposed areas of the filament and is reflected as illustrated by arrow lines in FIG. 9, compared with the conventional flow shown in FIG. 5.

To complete the assembly of the device illustrated in FIGS. 6 and 7, leads 40′ make the required electrical contacts between the connector 20′ and the filaments. Hermetic seals are provided by metal, e.g. silver or aluminum, discs 60, 61 which, like discs 22 and 23 in FIG. 3, act effectively as seals or gaskets. As previously mentioned and while not shown, it should be understood that the assembly pieces of FIGS. 6 and 7 are rigidly bolted together. The various discs and other members referred to are provided with appropriate holes and threaded connections to receive such bolts, pass the electrical leads and provide passageways for the respective gases. It should also be understood with regard to all embodiments that for all the mating surfaces appropriate provision should be made for obtaining relatively smooth flat surfaces to improve hermetic sealing. Disc 46 should be substantially rigid.

In FIGS. 10 and 11 a second and somewhat different embodiment of the invention is illustrated. In particular, a filament mounting disc 60, shown inverted in FIG. 11, is made sufficiently "thick" so as to provide a pair of rectangular cavities 61, 62. The word "thick" is used here only in a relative sense of comparing the first and second embodiments. Actually, since the invention structure and method lends itself to extremely small volume, 10 microliters or less chambers, the disc 60 can be substantially thin and still provide cavities 61, 62. On the respective bottom walls B1, B2 of such cavities the respective filaments R1‴, R2‴, R3‴ and R4‴ are formed, adhered and supported. Cavities 61, 62 provide the required volume or space and effectively form the "chamber" so as to eliminate the need for the additional slotted disc 54 shown in FIGS. 7, 8 and 9. The assembly of FIG. 10 is completed by leads 40″ which make appropriate electrical connection to connector 20″. A pair of metal, e.g. silver or aluminum, discs 65, 66 provide hermetic seals or gaskets for the assembly which is tightly bolted together as previously explained.

A third embodiment is illustrated by FIGS. 12 and 13 and which is particularly suited to those measurements which do not require absolute precision and for which a relatively inexpensive and yet sensitive device is needed. For example, in many high concentration, high volume process gases it is not necessary to analyze in terms of precision. For such application, two opposing cylindrical blocks 70, 71 are adapted to be tightly bolted together by means of bolts, not shown. Block 70 mounts an inlet pipe 72, and an outlet pipe 73 which communicate with a void or chamber 75 formed in block 70. Blocks 70 and 71 may both be formed of metal, e.g. tantalum, and a thin disc 76 is formed as a tantalum oxide coating on block 71 to provide a thermally and electrically insulating disc mount for a filament R3'''' formed in the manner of the invention as previously explained. Suitable leads 40''' connect the filament to the circuitry of FIG. 13. Blocks 70 and 71 are of course clamped together and filament R3'''' occupies chamber 75. As previously explained, disc, i.e. coating, 76 can be seen to serve both as a gas reflecting barrier and as a support for filament R3''''.

In FIG. 13, resistances R1'''', R2'''' and R4'''' are electrical resistances of fixed value, are not positioned in a "chamber" and are not subject to contacting either a reference or sample gas because of the imprecise measurements to which this third embodiment is directed. Only resistance R3'''' acts as a filament and is the only filament which contacts the sample gas. In this very basic and simplified third embodiment it will nevertheless be noted that filament R3'''' even though the only active filament may be formed in the manner of the first and second embodiments. For a simple, single chamber, non-precision and inexpensive system the same advantages are achieved.

To summarize what has been described, it can be said that the method and structure of the invention effectively overcomes many of the recognized disadvantages and limitations inherent to conventional micro size, i.e. 10 microliters or less, flow through type thermal conductivity detectors. The problem of carefully electrically matching the conventional wire filaments is no longer a problem. The delicate manufacturing operations of securing each wire filament at its end points, of securing the stringers to the filaments and of securing the stringers to the substrate are all eliminated by the invention.

With the invention, specific resistance is far less critical for the same degree of accuracy and techniques for precision physical and electrical forming of the filaments on the mounting discs are readily available and include vacuum deposition, electro deposition, fired colloidal dispersion, and chemical etching. The invention is also unique in recognizing that sufficient filament contact area, i.e. between gas and filament, in micro size chambers does not require that the flow pattern of the gas completely envelop the filament as in the prior art device. According to the invention, very satisfactory results are achieved in micro size chambers of substantially smaller size than have heretofore been achieved but with a flow pattern in which the respective gases merely contact certain exposed surfaces of the filaments, not the entire surface areas as in prior art devices, and are reflected by the substrate on which the filaments are mounted. Electrical noise as such is eliminated since bending and sagging of the filament and filament stringers no longer exists. Further, the device of the invention is not position dependent and is operable with equally satisfactory results whether vertically oriented as in FIG. 6, horizontally oriented as in FIG. 6A or in any other angular position. In another important respect the mounting disc (disc 24) on which the filaments are mounted and the mating slotted disc (disc 25) can now be made substantially thinner than ever before because allowance for filament sag is no longer a design requirement. This feature of the invention inherently opens the way to substantially smaller size micro chambers than have ever been known to the art. New filament materials, e.g. gold, are now possible even though of substantially less specific resistance than conventional filaments materials, e.g. tungsten and platinum, since specific resistance is no longer as critical. Gold is chemically inert at high and low filament temperatures and this offers a real advantage in analyzing many kinds of gases. For equivalent resistive filaments, the method and structure of the invention provides considerably higher response detectors.

Viewed in other respects, it can be said that the invention enables more filament surface area for gas contact but with substantially less dead volume in the chamber. This means a higher absolute sensitivity and chamber sizes down to within the range of 20 nanoliters. Typical disc thickness for both the mounting disc and the slotted chamber forming disc according to the first embodiment of the invention will be 0.001 to 0.005 inch. A typical filament will be 0.360 inch in length, 0.000005 inch thick and 0.031 inch in width. Very high ohmic resistances are obtainable and in the order of 500 to 1000 ohms per filament. Those skilled in the art will immediately recognize the very sharp decrease in disc thickness and increase in filament resistance both of which characteristics are desirable. For example, amino acids, fatty acids and steroids require relatively high temperatures to vaporize. It can thus be seen that the invention is ideally suited to analyzing minute quantities of such substances because of the small chamber size, e.g. 20 nanoliters, and the very high filament temperatures, e.g. 600° C., that can be achieved and maintained.

Those skilled in the art will recognize that the respective tubes and electrical conductors lend themselves to mounting arrangements other than those shown. For example, both tubes and conductors may be mounted in the same end cap and oriented parallel to each other. Also, the tubes or conductors may enter from the side and be arranged non-parallel. Nevertheless, all such configurations lend themselves very readily to the micro size chamber and filament forming and mounting arrangements of the invention. The described "discs" may be of any shape or even a coating as in FIG. 12. Electrical circuits other than "bridge" circuits may also be employed in conjunction with filaments and filament chambers made according to the invention. Various metals and electrically and thermally insulating materials may be employed for the end caps, discs and gaskets described.

The well-known prior art "sputtering" process for forming thin films to be observed in electron-microscopy observations may be used as a process for forming the thin film conducting strips required for this invention. The sputtering process effectively forms layers of metallic globules which adhere in thin film layer form. In order to obtain the desired final degree of physical and electrical precision, the sputtered film strips are annealed at a temperature sufficiently high and for a time sufficiently long to smooth the film surface and establish "stable" electrical characteristics. By "stable" electrical character is meant that the thin film conductor at the normal operating temperatures of the invention detector tends to exhibit electrical resistances which are always the same at those temperatures and that such stable electrical character is maintained over the normal life of the detector. That is, the sputtering technique gives a degree of film surface smoothness and a degree of film surface smoothness and a degree of electrical stability but an annealed sputtered thin film gives a much improved electrical stability. Nickel is preferred as the sputtered material and, since time and temperature are somewhat interdependent in the annealing step, those skilled in the art may readily determine a desirable time-temperature sequence once the advantage of annealing the sputtered film has been discovered and pointed out. Also, annealing substantially improves the smoothness of the thin film and thus improves the thermal conducting character.

What is claimed is:

1. A flow through thermal conductivity detector operable independent of position orientation and adapted to analyze gas volumes in the order of 10 microliters or less in a chamber of comparable size and having each detecting filament therein arranged as part of an electrical detecting circuit, comprising in combination:
   a. first and second end cap members having mounted therein for each detected gas of interest tube means for receiving and exhausting such gas and wire leads for making external connection to each detecting filament of said detector, said cap members having opposed flat surfaces adapted to be secured together;
   b. a filament mounting disc in the form of a disc of electrically and thermally insulating material and adapted to be secured between said cap member surfaces;
   c. at least one electrically conducting detecting filament for each said detected gas, each said filament being in the form of an electrically and physically precision formed thin strip adhered throughout its length to a selected side wall surface of said filament mounting disc;
   d. chamber forming means mating with said mounting disc and in cooperation with said mounting disc providing when said cap members are secured together for each said detecting filament a chamber of 10 microliters or less in volume communicating with said tube means and in which the area of said side wall surface occupied by said detecting filament constitutes a portion of the wall area defining the volume of said chamber and serves as a reflecting barrier for gases contacting said filament;
   e. means to rigidly and tightly secure said first and second end cap members, said mounting disc and said chamber forming means together wherein said chamber is formed and sealed from entry of external gases and each said gas is enabled to be received and exhausted through said tube means, contact exposed surfaces of a said filament in a said chamber and be reflected by said disc wall area on which said filament is mounted; and
   f. means electrically connecting each said detecting filament to said leads wherein each said filament is electrically connected in a said detecting circuit.

2. A detector as claimed in claim 1 wherein said chamber forming means comprises additional slotted disc means having an open slot for each pair of said filaments and arranged to mate such pair and the said mounting disc surface occupied by such pair to form a said chamber.

3. A detector as claimed in claim 2 wherein said circuit is a bridge circuit.

4. A detector as claimed in claim 1 wherein said mounting disc provides a cavity for each said pair of filaments and said mounting disc comprises said chamber forming means, each pair of said filaments is mounted on a wall of said cavity, the volume of said cavity provides substantially the entire volume of a said chamber and the wall of said cavity on which each respective said filament pair is mounted provides a reflecting barrier for any gas entering such chamber.

5. A detector as claimed in claim 1 having four said filaments arranged in a bridge circuit and with each pair of said filaments occupying a separate said chamber.

6. A detector as claimed in claim 1 wherein said first cap member mounts said tube means, said second cap member mounts said wire leads, plural filaments arranged in laterally spaced pairs are provided for each said chamber and said chamber forming means comprises additional disc means.

7. A detector as claimed in claim 1 wherein the respective opposed flat surface of one of said cap members is formed with a cavity and serves as said chamber forming means.

8. A detector as claimed in claim 1 wherein said filament mounting disc is made relatively thick and formed with a cavity and serves as said chamber forming means.

9. A detector as claimed in claim 1 wherein said filament mounting disc comprises an electrically and thermally insulating coating adhered to a selected said cap member opposed surface.

10. A detector as claimed in claim 1 having plural filaments, chambers and tube means, said filaments all being mounted on said mounting disc and arranged by pairs for each said chamber and said tube means being arranged to direct to one chamber a reference gas and to another chamber a sample gas and wherein said chamber forming means comprises additional disc means positioned adjacent said mounting disc and provided with open slots mating with said filament pairs and effective to form said chambers.

* * * * *